(12) United States Patent
Aggarwal et al.

(10) Patent No.: US 7,940,646 B1
(45) Date of Patent: *May 10, 2011

(54) PERFORMING NON-REVERTIVE FAILOVER WITH NETWORK DEVICES

(75) Inventors: Rahul Aggarwal, San Francisco, CA (US); Nischal Sheth, Los Altos, CA (US)

(73) Assignee: Juniper Netwoks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/788,115

(22) Filed: May 26, 2010

Related U.S. Application Data

(63) Continuation of application No. 11/621,434, filed on Jan. 9, 2007, now Pat. No. 7,738,367.

(60) Provisional application No. 60/840,821, filed on Aug. 29, 2006.

(51) Int. Cl.
*G01R 31/08* (2006.01)
(52) U.S. Cl. ...................................................... 370/216
(58) Field of Classification Search ........................ None
See application file for complete search history.

(56) References Cited

U.S. PATENT DOCUMENTS

| 7,139,263 | B2 * | 11/2006 | Miller et al. | 370/352 |
|---|---|---|---|---|
| 7,561,527 | B1 * | 7/2009 | Katz et al. | 370/241 |
| 7,609,637 | B2 * | 10/2009 | Doshi et al. | 370/235 |
| 7,738,367 | B1 | 6/2010 | Aggarwal et al. | |
| 2005/0083936 | A1 | 4/2005 | Ma | |
| 2005/0195741 | A1 | 9/2005 | Doshi et al. | |
| 2006/0233107 | A1 | 10/2006 | Croak et al. | |
| 2006/0239201 | A1 | 10/2006 | Metzger et al. | |
| 2007/0180104 | A1 | 8/2007 | Filsfils et al. | |
| 2007/0180105 | A1 | 8/2007 | Filsfils et al. | |
| 2007/0207591 | A1 * | 9/2007 | Rahman et al. | 438/439 |
| 2007/0280102 | A1 * | 12/2007 | Vasseur et al. | 370/225 |
| 2008/0049622 | A1 * | 2/2008 | Previdi et al. | 370/237 |
| 2008/0074997 | A1 | 3/2008 | Bryant et al. | |
| 2008/0253295 | A1 | 10/2008 | Yumoto et al. | |
| 2009/0016213 | A1 * | 1/2009 | Lichtwald | 370/225 |
| 2009/0046579 | A1 * | 2/2009 | Lu et al. | 370/225 |
| 2009/0046723 | A1 * | 2/2009 | Rahman et al. | 370/395.31 |

* cited by examiner

*Primary Examiner* — Chi H Pham
*Assistant Examiner* — Fan Ng
(74) *Attorney, Agent, or Firm* — Shumaker & Sieffert, P.A.

(57) ABSTRACT

Techniques are described for performing non-revertive failover with network devices. A network device comprising a control unit and interface cards receives routing information protocol (RIP) updates each having a metric value. The control unit signals bidirectional forwarding detection (BFD) sessions based on the metric values of each of the RIP updates with, for example, a media gateway. The control unit also selectively installs a RIP route based on the metric values. The media gateway monitors the BFD sessions, and upon failure of an active BFD session, indicates the network device to perform non-revertive failover by sending a revised plurality of RIP updates. The network device performs non-revertive failover according to the revised plurality of RIP updates. Because of the flexibility of BFD, the network device need not revert back to a previous RIP route, therefore curtailing excessive failover.

25 Claims, 5 Drawing Sheets

PERFORMING NON-REVERTIVE FAILOVER WITH NETWORK DEVICES

This application is a continuation of U.S. patent application Ser. No. 11/621,434, filed Jan. 9, 2007, which claims the benefit of U.S. Provisional Application Ser. No. 60/840,821, filed Aug. 29, 2006, the subject matter of each being incorporated herein by reference.

TECHNICAL FIELD

The invention relates to network devices, and more particularly, to techniques for performing failover with network devices.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

Certain devices within a network, referred to as routers, maintain routing information that describes available routes through the network. Each route defines a path between two locations on the network. Upon receiving an incoming data packet, the router examines header information within the packet to identify the destination for the packet. Based on the header information, the router accesses the routing information, selects an appropriate route for the packet and forwards the packet accordingly.

Recently, development of certain applications, such as Voice-over-Internet Protocol (VoIP) applications have led to the development of network devices that act as gateways capable of interconnecting public system telephone networks (PSTNs), or more generally circuit-switched networks, to packet-switched networks, such as the Internet. These "media gateways" enable subscribers of the PSTN to initiate and receive calls from subscribers of the VoIP applications by transcoding the PSTN voice signals and VoIP packets into packets and voice signals, respectively. By joining these two networks, the media gateways enable interoperability between two diverse technologies, while increasing the calling options of the networks' respective subscribers.

In order to interconnect these two network types, routers at the edge of the packet-switched networks, i.e., edge routers, interact with the media gateways at the edge of the circuit-switched networks. A media gateway may, for example, arrange for dedicated routes through a packet-switched network to handle calls originating from a PSTN subscriber. The media gateway arranges these dedicated routes by transmitting messages via a protocol to an edge router, and in response, the edge router establishes the dedicated routes through the packet-switched network.

Commonly, the media gateway may also establish secondary, or standby, routes through the packet-switched networks that remain unused or only partially used, which enables them to accept voice traffic should communications fail over the original route. Often times, the standby routes require the media gateway to elect a backup router, which it may specify via the virtual router redundancy protocol (VRRP). In the event communications fail over the original dedicated routes, the media gateway may detect such failure, elect the backup router as the active router via the VRRP, and begin forwarding voice traffic over the standby routes.

While enabling the election of the backup router, VRRP is limited and inflexible. For example, VRRP limits media gateways with respect to the richness of the redundancy supported between the hosts and the media gateways. Media gateways employing VRRP may be slow to fail over to stand by routes, i.e., begin forwarding voice traffic over the standby routes, after detecting a communication failure. Moreover, once the previous route recovers from the failure VRRP typically reverts back to forwarding voice traffic via the previous route. Slow failover and excessive reverting by the media gateway may cause communication delays that affect the quality of the voice traffic.

SUMMARY

In general, the invention is directed to techniques for performing non-revertive failover with network devices. The techniques may be useful in curtailing excessive failover that can result through application of conventional revertive failover techniques, such as those embodied in VRRP. Moreover, the techniques of the invention may enable network devices to specify scalable sub-second failover. By curtailing excessive failover and enabling sub-second failover, the techniques may improve communication quality in the event of failure of an active route.

According to the techniques, a network device, such as a router, comprising a plurality of interface cards may receive a plurality of routing information protocol (RIP) updates, each having a metric value. Via the metric value, another network device, such as a media gateway, may configure the metric value of these RIP updates to an infinite value, which may be represented by the number 16, or to a value less than infinity, which may be represented by any number less than 16. The network device also comprises a control unit that signals a plurality of bidirectional forwarding detection (BFD) sessions based on the metric value, selectively installs a RIP route in routing information maintained by the control unit based on the metric value, and performs non-revertive failover in the event one of the plurality of BFD sessions fails.

For example, a media gateway may generate a plurality of RIP updates, where each RIP update corresponds to a link connecting the media gateway to a plurality of network devices, and includes a metric value. One such network device may receive one or more of the RIP updates and analyze the RIP updates to determine the associated metric value. If the metric value equals infinity, the control unit of the network device may signal a standby BFD session with the media gateway via an associated link; however, if the metric value equals a number less than infinity, the control unit may signal an active BFD session with the media gateway via an associated link. Also upon determining that one of the metric values equals a number less than infinity, the control unit establishes a dedicated RIP route through its associated network in accordance with the RIP update. The media gateway may forward and receive voice traffic over this dedicated RIP route.

While forwarding such traffic, the media gateway may monitor the active BFD session in order to determine a failure within the RIP route. If the media gateway detects a failure, the media gateway generates a revised plurality of RIP updates having metric values that indicate the network device should perform a non-revertive failover. Upon receiving these revised RIP updates, the network device performs the non-revertive failover according to the RIP updates. Typically, in response to these revised RIP updates, the network device removes the RIP route established by the previous RIP updates from its routing information and signals the previously active BFD session as standby. The network device will not revert to forwarding voice traffic along the now removed RIP route, unless specifically indicated to by another plurality of RIP updates. In this way, the network device performs non-revertive failover.

In one embodiment, a method comprises receiving a plurality of RIP updates each having a metric value; signaling a plurality of BFD sessions based on the metric value of each RIP update; selectively installing a RIP route in routing information maintained by a control unit based on the metric value; and performing non-revertive failover in the event one of the plurality of BFD sessions fails.

In another embodiment, a network device comprises a plurality of interface cards that receive a plurality of RIP updates each having a metric value, and a control unit that signals a plurality of BFD sessions based on the metric value of each RIP update, selectively installs a RIP route in routing information maintained by the control unit based on the metric value, and performs non-revertive failover in the event one of the plurality of BFD sessions fails.

In a further embodiment, a computer-readable medium comprises instructions for causing a programmable processor to receive a plurality of RIP updates each having a metric value, signal a plurality of BFD sessions based on the metric value, selectively install a RIP route in routing information maintained by a control unit based on the metric value, and perform non-revertive failover in the event one of the plurality of BFD session fails.

In yet another embodiment, a method comprises sending a plurality of RIP updates that each have a metric value with a gateway network device that acts as a gateway between a circuit-switched network and a packet-switched network to a network device that routes traffic through the packet-switched network, and signaling a plurality of BFD sessions to the gateway network device with the network devices based on the metric value of each RIP update. The method further comprises selectively installing a RIP route in routing information maintained within the network devices based on the metric value of each RIP update, and performing non-revertive failover in the event one of the plurality of BFD sessions fails with the network device.

In a further embodiment, a network system comprises a gateway network device that acts as a gateway between a circuit-switched network and a packet-switched network and includes at least two interfaces that send a plurality of routing information protocol (RIP) updates that each have a metric value. The network system further includes a network device that routes traffic through the packet-switched network and includes routing information that describes the topology of the packet-switched network, and a control unit that signals a plurality of bidirectional forwarding detection (BFD) sessions based on the metric values of each RIP update, selectively installs a RIP route in the routing information based on the metric values of each RIP update, and performs non-revertive failover in the event one of the plurality of BFD sessions fails The details of one or more embodiments of the invention are set forth in the accompanying drawings and the description below. Other features, objects, and advantages of the invention will be apparent from the description and drawings, and from the claims.

DETAILED DESCRIPTION

Figure 1:
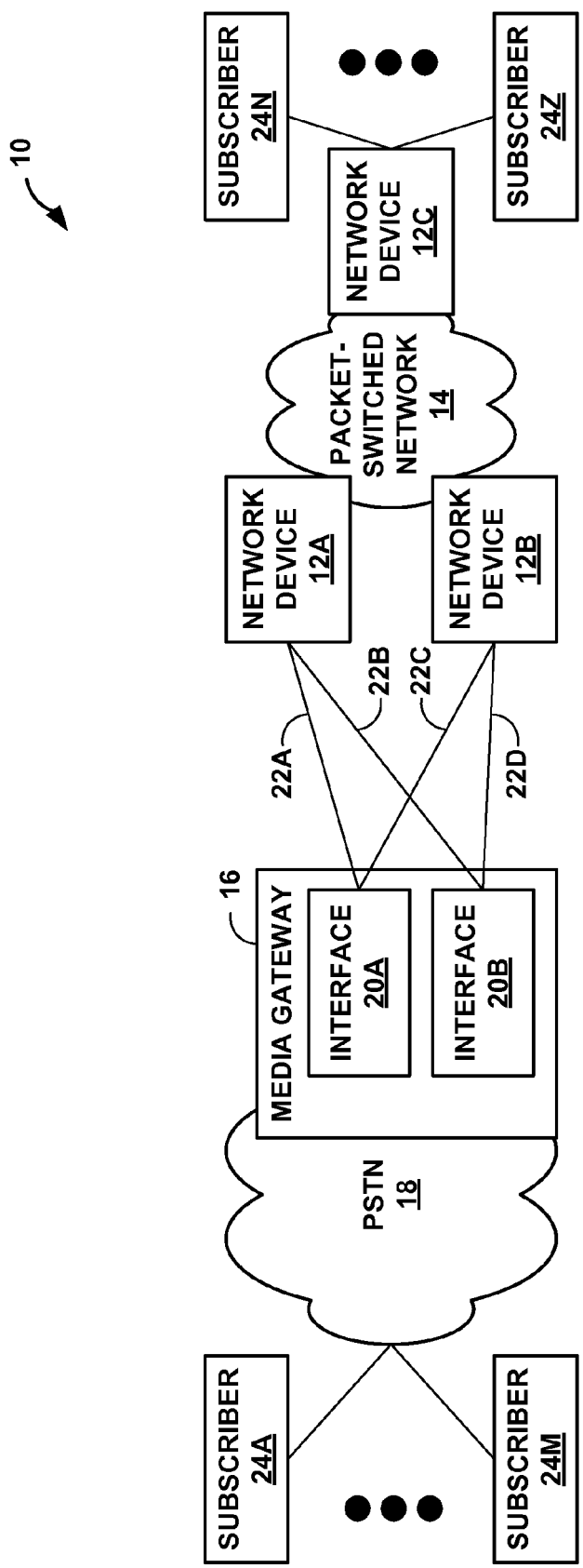
FIG. 1 is a block diagram illustrating an exemplary network environment in which network devices perform non-revertive failover in accordance with the principles of the invention.

FIG. 1 is a block diagram illustrating an exemplary network environment 10 in which network devices 12A, 12B perform non-revertive failover in accordance with the principles of the invention. Network environment 10 includes network devices 12A-12C ("network devices 12") that lie on the edge of packet-switched network 14 and a media gateway 16 that lies on the edge of public system telephone network 18 ("PSTN 18"). Media gateway 16 includes interfaces 20A, 20B ("interfaces 18") that couple to network device 12A via respective network links 22A, 22B and network device 12B via respective network links 22C, 22D. Network environment 10 also includes subscribers 24A-24M that subscribe to the telephone service provided by the operators of PSTN 16 and subscriber 24N-24Z that subscribe to the VoIP service provided by the operators of packet-switched network 14.

Packet-switched network 14 represents any packet-switched network capable of routing packets and may comprise any number of network devices (not shown), such as routers, hubs, switches, network accelerators, servers, and remote databases. Packet-switched network 14 may be a public network such as the Internet, or may comprise a private network. Although described in reference to packet-switched network 14, the principles of the invention may equally apply to cell-based networks, such as asynchronous transfer mode (ATM) networks. For purposes of describing this invention, therefore, cell-based networks, although different, may be thought of as packet-switched networks.

Network devices 12 lie at the edge of packet-switched network 14 and provide interconnectivity with media gateway 16, and therefore, PSTN 18, and subscribers 24N-24Z. Typically, network devices 12 comprise routers capable of storing routing information that describes the topology of packet-switched network 14. Network devices 12 refer to the stored routing information to forward packets across packet-switched network 14. Network devices 12A-12C may exchange this routing information via one or more internal or external routing protocols. Exemplary internal routing protocols include the Interior Border Gateway Protocol (IBGP), the Routing Information Protocol (RIP), the Bidirectional Forwarding Detection (BFD) protocol, or the Open Shortest Path First (OSPF) protocol. Exemplary external routing protocols include the External Border Gateway Protocol (EBGP, in some instance EBGP is referred to simply as BGP), the Exterior Gateway Protocol (EGP), or the Inter-Domain Routing Protocol (IDRP).

Subscribers 24N-24Z may employ a wide variety of computing devices to access packet-switched network 14 via network device 12C. For example, subscribers 24N-24Z may employ workstations, personal desktop computers, laptop computers, personal digital assistants (PDAs), cellular-phones, and VoIP telephones, as well as devices that feature a combination of any of the above.

PSTN 18 represents an exemplary circuit-switched network. PSTN 18 may comprise a number of large central offices that house circuit-switching devices for routing voice signals through PSTN 18. Subscribers 24A-24M typically access PSTN 18 through the use of a standard, or wireless, telephone part of which couples via a phone jack and cord to PSTN 18. Subscribers 24A-24M may also employ workstations, personal desktop computers, laptop computers, personal digital assistants (PDAs), and cellular-phones, as well as devices that feature a combination of any of the above to access PSTN 18.

Media gateway 16 represents a network device that acts a gateway for interconnecting PSTN 18 with packet-switched network 14. In particular, media gateway 16 provides the bearer circuit interfaces, i.e., interfaces 18, to PSTN 16 and transcodes media streams, or voice traffic, into signals and packets depending on the destination of the voice traffic. Media gateway 16 also typically arranges dedicated routes and standby routes through packet-switched network 14. Media gateway 16 may forward voice traffic over the dedicated routes and may switch over to the standby routes.

In accordance with the techniques described herein, media gateway 16 generates and forwards a plurality of RIP updates to network devices 12A, 12B via network links 20A-20D ("network links 20") to establish the dedicated routes. Each of the RIP updates comprises a metric value. Network devices 12A, 12B receive the RIP updates, and depending on the metric value, one of network devices 12A, 12B establish the RIP route signaled by the corresponding RIP update having the appropriate metric value. In order to establish the RIP route, the appropriate one of network devices 12A, 12B installs the RIP route to its routing information and advertises the RIP route via one of the above described routing protocols to its neighboring network device 12.

After establishing the RIP route, i.e., a dedicated route through packet-switched network 14, network devices 12A, 12B may signal a plurality of BFD sessions to media gateway 16 based on the metric value. Network devices 12A, 12B may signal one of the plurality of BFD sessions as an active BFD session depending on the metric value. Typically, the one of network devices 12A, 12B that established the RIP route also signals one of the plurality of BFD sessions as an active BFD session. Network devices 12A, 12B establish the plurality of BFD sessions, both active and standby BFD sessions, with media gateway 16, each over a separate one of network links 20. Media gateway 16 monitors the active BFD session in order to detect communication failures across the established RIP route.

In the event of a communication failure, media gateway 16 causes network devices 12A, 12B to perform non-revertive failover by once again generating and forwarding RIP updates. Upon receiving these revised RIP updates, network devices 12A, 12B perform non-revertive failover, or in other words, re-route the voice traffic through the one of network devices 12A, 12B that did not establish the original RIP route. By employing BFD sessions to monitor the communication of voice traffic, media gateway 16 may more quickly detect communication failures relative to conventional backup techniques, such as VRRP. Moreover, the use of BFD coupled with RIP allows for non-revertive failover, meaning that network routers 12A, 12B will not have to continually update routing information to account for excessive reversion. Media gateway 16 need only implement a subset of RIP, e.g., those features used in conjunction with BFD to provide fast non-revertive failover as described herein. In some embodiments, a routing protocol other than RIP may be used by media gateway 16 and network devices 12 in conjunction with BFD to perform non-revertive failover in accordance with the principles of the invention.

Although described above in the context of only two network devices 12A, 12B, media gateway 16 may include a plurality of interfaces that couple to two or more network devices. By employing BFD, media gateway 16 may specify each of the coupled network devices as either active or standby. Thus, network devices 12A, 12B may provide scalable sub-second failover by specifying more than two network devices as standby.

Figure 2:
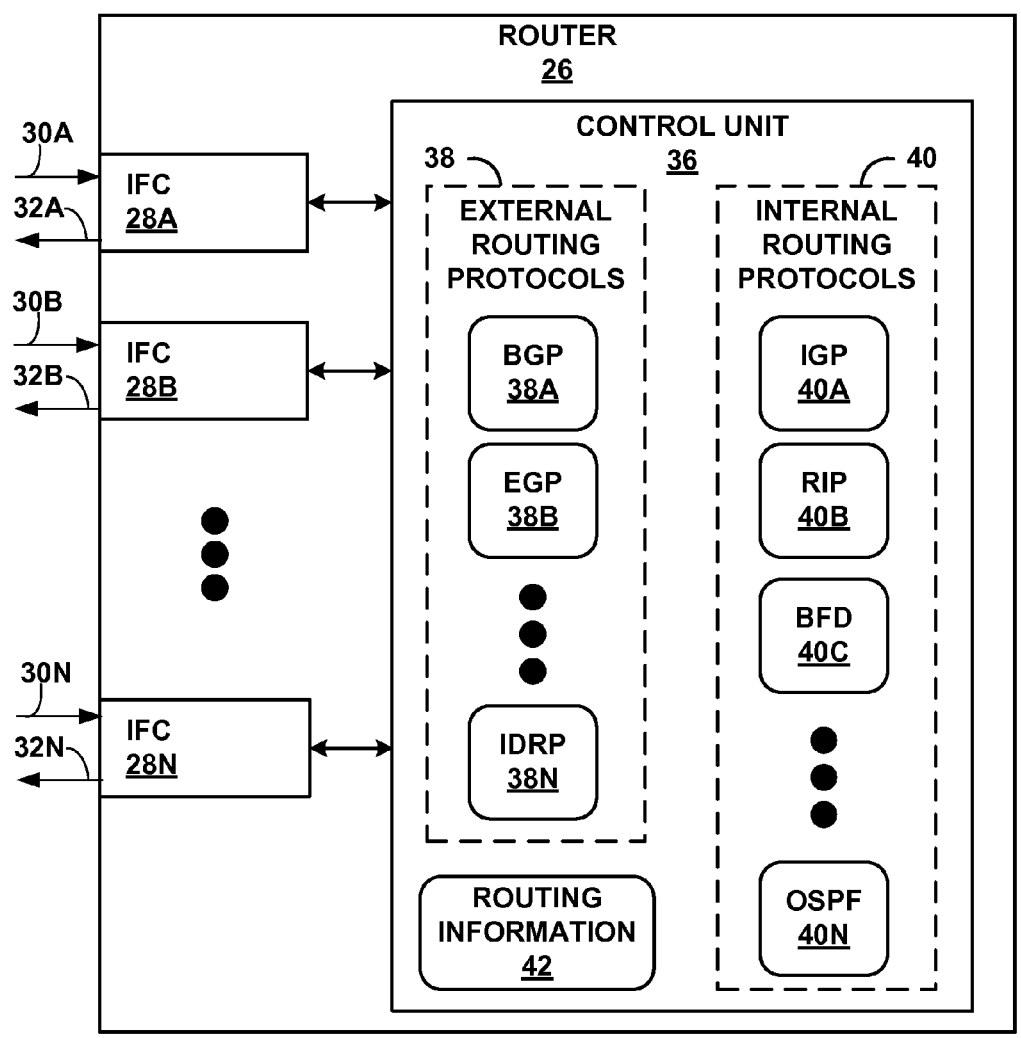
FIG. 2 is a block diagram illustrating a router, which may be an exemplary embodiment of one of the network devices of FIG. 1, and that performs non-revertive failover in accordance with the principles of the invention.

FIG. 2 is a block diagram illustrating router 26, which may be an exemplary embodiment of network device 12A of FIG. 1, and that performs non-revertive failover in accordance with the principles of the invention. As shown in FIG. 2, router 26 comprises interface cards (IFCs) 28A-28N ("IFCs 28") for communicating packets via inbound links 30A-30N and output links 32A-32N. A pairing of input and output links, such as input link 30A and output link 32A, may comprise a single link, such as one of links 20, over which router 26 may signal one of the above described plurality of BFD sessions with a media gateway, such as media gateway 16.

Router 26 also includes control unit 36 that supports a set of external routing protocols 38A-38N ("external routing protocols 38") and internal routing protocols 40A-40N ("internal routing protocols 40"). Exemplary external routing protocols 38 include BGP 38A, EGP 38B, and IDRP 38N. Exemplary internal routing protocols 40 include IGP 40A, RIP 40B, the BFD 40C, and OSPF 40N. Router 26 may exchange routing information via any of the supported external or internal routing protocols in the form of advertisements. More particularly, router 26 may establish a RIP route via RIP 40B, advertise the RIP route via one of BGP 38A and Interior Gateway Protocol (IGP) 40A, and signal the BFD sessions via BFD protocol 40C. Control unit 36 may comprise a programmable processor capable of executing instructions that cause it to perform the techniques of the invention described herein.

Control unit 36 may provide an interface (not shown in FIG. 2) by which a network administrator may configure router 26. In order to perform a non-revertive failover, the network administrator may configure router 26 via the interface to enable BFD for RIP. The configuration typically enables router 26 to perform the techniques described below in reference to FIGS. 4, 5. Control unit 36 may also be configurable via an automated process, such as by execution of scripts.

Control unit 36 also maintains routing information 42 that includes information describing the topology of packet-switched network 14. Depending on the metric values of received RIP updates, control unit 36 may install a new RIP route in routing information 42 in order to establish a dedicated route over which media gateway 16 may forward voice traffic. Control unit 36 may access routing information 42 to determine over which of IFCs 28 control unit 36 should forward received traffic.

For example, control unit 36 may establish a dedicated RIP route via RIP protocol 40B in response to RIP updates received from media gateway 16 via link 22A. Establishing the RIP route requires control unit 36 to install the RIP route within routing information 42 and advertise the RIP route to neighboring routers, e.g., network device 12B, via one of BGP 38A and IGP 40A. Link 22A may comprise links 30A, 32A, and therefore IFC 28A receives voice traffic destined for the dedicated RIP route from media gateway 16 and forwards the voice traffic to control unit 36. Control unit 36 receives the voice traffic that media gateway 36 previously converted from raw signal format into packets, i.e., "packetized," and based on conventional information contained within those packets, accesses routing information 42 to determine which of IFCs 28 should forward the voice traffic.

Generally, in accessing routing information 42, control unit 36 parses each packet of the voice traffic to obtain a destination address contained within the packet information, and performs a lookup within routing information 42 using the destination address as a key. Typically, routing information 42 stores next hops identified by a range of addresses, which are also associated with IFCs 28. After identifying the appropriate address range, and therefore the appropriate one of IFCs 28, control unit 36 forwards the voice traffic to the appropriate one of IFCs 28, which in turn forwards the voice traffic via one of its respective outbound links 32.

In some embodiments, control unit 36 may be replaced with a routing engine, which performs the routing operations discussed above with respect to routing information 42. In these embodiments, router 26 may further include a centrally located forwarding engine or a dispersed plurality of forwarding engines, where each of the dispersed forwarding engines resides within one of IFCs 28.

Figure 3:
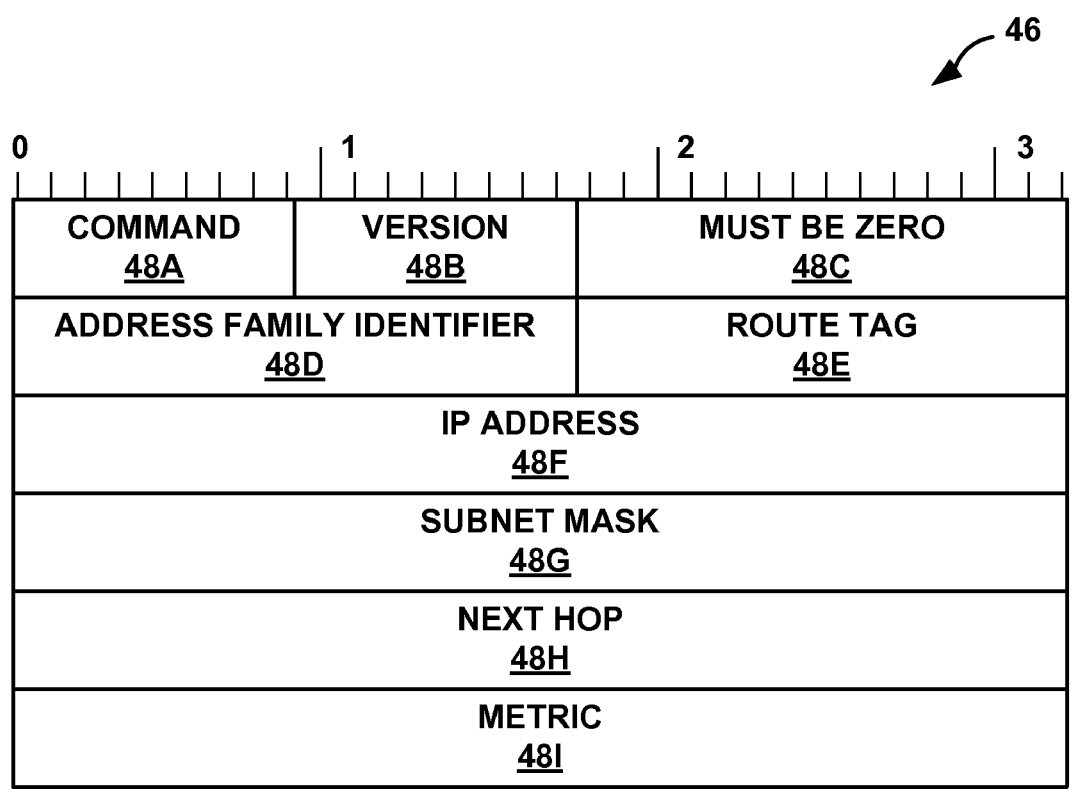
FIG. 3 is a block diagram illustrating an exemplary RIP update that the router of FIG. 2 may receive from the media gateway of FIG. 1.

FIG. 3 is a block diagram illustrating an exemplary RIP update 46 that router 26 of FIG. 2 may receive from media gateway 16 of FIG. 1. As shown in FIG. 3, RIP update 46 includes fields 48A-48I. More particularly, RIP update 46 includes a command field 48A, a version field 48B, a must be zero field 48C, an address family identifier field 48D, a route tag field 48E, an IP address field 48F, a subnet mask field 48G, a next hop field 48H, and a metric field 48I. Command field 48A and version field 48B each occupy one word, i.e., 8 bits or 1 byte, within RIP update 46. Must be zero field 48C, address family identifier field 48D, and route tag field 48E each occupy two words within RIP update 46. IP address field 48F, subnet mask field 48G, next hop field 48H, and metric field 48I each occupy four words within RIP update 46.

Typically, media gateway 16 constructs a RIP update, such as RIP update 46, by specifying each of fields 48. For example, media gateway 16 may set command field 48A to response, i.e., type=2, version field 48A to 2 (assuming the RIP update 46 is a version 2 update), must be zero field 48C to all zeros as the name suggests, address family identifier field 48D to 'IPv4,' i.e., type=2, IP address field 48F to the loopback address on media gateway 16, subnet mask field 48G to all ones, and next hop field 48H to zero. Media gateway 16 may set metric field 48I in accordance with the principles of the invention.

In particular, if media gateway 16 requires a dedicated RIP route, for example, with router 26, or more generally network device 12A, it may set metric value 48I to a number less than 16, i.e., less than "infinity," as 16 represents infinity according to RIP 40B. However, if media gateway 16 wishes to establish only standby BFD sessions with router 26, it may set metric value 48I to 16, i.e., infinity. Via this simple encoding technique, media gateway 16 may specify sub-second standby routes through packet-switched network 14 by transmitting multiple RIP updates, each one addressed to a different network device 12.

Figure 4:
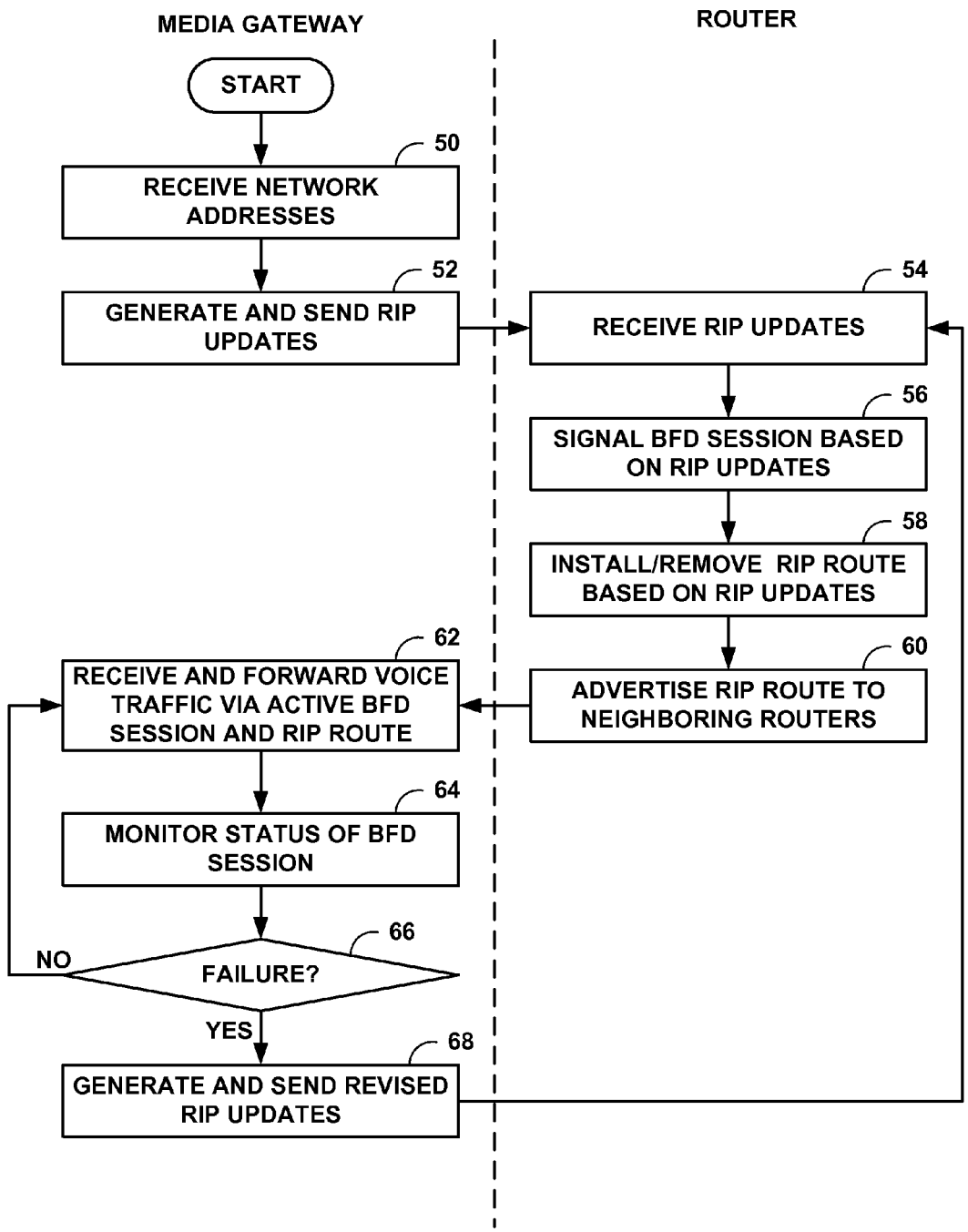
FIG. 4 is a flowchart illustrating exemplary operations of a media gateway and a router in performing non-revertive failover in accordance with the principles of the invention.

FIG. 4 is a flowchart illustrating exemplary operations of a media gateway and a router in performing non-revertive failover in accordance with the principles of the invention.

For example, media gateway 16 of FIG. 1 may generate and send a RIP update, such as RIP update 46 of FIG. 3, to router 26 of FIG. 2, which for purposes of illustration may be an exemplary embodiment of network device 12A. While described in reference to FIGS. 1-3, the principals of the invention may apply to any network environment having network devices capable of performing the techniques described herein and should not be limited to the illustrated embodiments.

Initially, a network administrator configures network device 12A to enable BFD for RIP, thereby causing media gateway 16 to receive the network addresses of network devices 12A, e.g., router 26, and 12B (50). Next, media gateway 16 generates and sends a plurality of RIP updates, which may be similar to RIP update 46, to network devices 12A, 12B via interfaces 20 (52). In generating the plurality of RIP updates, media gateway 16 may set fields 48 of RIP update 46, for example, in the manner described above. Assuming for purposes of illustration that media gateway 16 determines network device 12A, or router 26, should maintain the dedicated RIP route, media gateway 16 sets metric field 48I to a number less than infinity, i.e., 16. Media gateway 16 sets metric field 48I for every other one of the plurality of RIP updates 46 to infinity, i.e., 16. Media gateway 16 may send each of the plurality of RIP updates 46 via a respective one of links 22. Thus, network device 12A receives a first RIP update having a metric value of less than infinity via link 22A, as well as a second RIP update having a metric value equal to infinity via interface link 22B. Network device 12B also receives third and fourth RIP updates each having a metric value of infinity, via links 22C and 22D, respectively (54).

Upon receiving the plurality of RIP updates 46, router 26, for example, analyzes the first and second RIP updates 46 and signals a BFD session based on the first and second RIP updates 46 (56). In particular, control unit 36 determines whether any of the first and second RIP updates are "active," i.e., whether each of metric fields 48I contains a value less than infinity. Assuming the first RIP update 46 contains a metric value of less than infinity, control unit 26 parses the first RIP updates 46 according to RIP 40B and determines that the first RIP update 46 is active. Control unit 26 also parses the second RIP update 56 according to RIP 40B and determines the second RIP update 46 is standby because the metric value of the second RIP update 46 is equal to infinity. In response to the active RIP update 46, control unit 26 signals an active BFD session with interface 20A of media gateway 16 via BFD 40C and link 20A. In response to the standby RIP update 46, control unit 36 signals a standby BFD session with interface 20B of media gateway 16 via BFD 40C and link 20B.

Based on the now-determined active and standby RIP updates 46, control unit 26 also installs a RIP route to routing information 42 based on next hop field 48H of active RIP update 46 (58). In other words, control unit 36 adds the RIP route to network device 12C with interface 18A as the next hop. Once installed, control unit 26 may advertise this RIP route to neighboring network devices 12B, 12C via one of BGP 38A and IGP 40A (60). Control unit 26 transmits this advertisement via one of IFCs 28. Upon advertising the RIP route, media gateway 16 may transmit voice traffic, for example, to router 26 via the active BFD session and receive voice traffic via the RIP route (62).

While routing voice traffic, media gateway 16 may monitor the active BFD session existing over link 22A to determine the status of the BFD session (64). In the event media gateway 16 determines that the BFD session remains active ("NO" branch of 66), media gateway 16 may continue to forward voice traffic and monitor the status of the active BFD session (62, 64). However, if media gateway 16 determines that the active BFD session has failed ("YES" branch of 66), media gateway 16 causes router 26 to perform non-revertive failover by generating and sending revised RIP updates 46 (68). Revised RIP updates 46, as before, constitute another plurality of RIP updates. Because the active BFD session failed, media gateway 16 constructs first and second revised RIP updates 46 each having a metric value equal to infinity, which it sends to router 26 via links 22A, 22B, respectively. This in effect signals to router 26 that the previously active RIP route should now be removed and the BFD session signaled as standby. Media gateway 16 also generates third and fourth revised RIP updates 46, where one of the metric values associated with either the third or fourth revised RIP updates 46 equals a number less than 16, which media gateway 16 sends to network device 12B via links 22C, 22D. This in effect signals to network device 12B that network device 12B should establish a RIP route and signal as active at least one of the BFD sessions via the appropriate one of links 22C, 22D.

Router 26, as described above, receives the first and second revised RIP updates 46, and signals both of the BFD sessions over links 22A, 22B as standby (54, 56). Because both of first and second revised RIP updates 46 have metric values equal to infinity, control unit 26 does not install the RIP route, but instead may remove the previously installed RIP route from routing information 42 (58). Control unit 26 may also advertise the removal of this RIP route via BGP 38A or IGP 40A (60).

In this manner, router 26 may perform non-revertive failover in accordance with the principles of the invention. Because router 26 maintains a plurality of BFD sessions, media gateway 16 may quickly detect a failure of the active BFD session and initiate the non-revertive failover. The failover is "non-revertive" in the sense that once router 26 receives the first and second revised RIP updates, router 26 removes the RIP route from routing information 42 and does not reinstall the RIP route until a later RIP updates indicates that the RIP route should be reinstalled. In other words, upon failover, media gateway may continue to forward voice traffic via a new RIP route established by network device 12B even though the previous RIP route established by router 26 may come back online. By enabling non-revertive failover, router 26 may possibly reduce excessive failover that would introduce delay and degrade the quality of communication.

Figure 5:
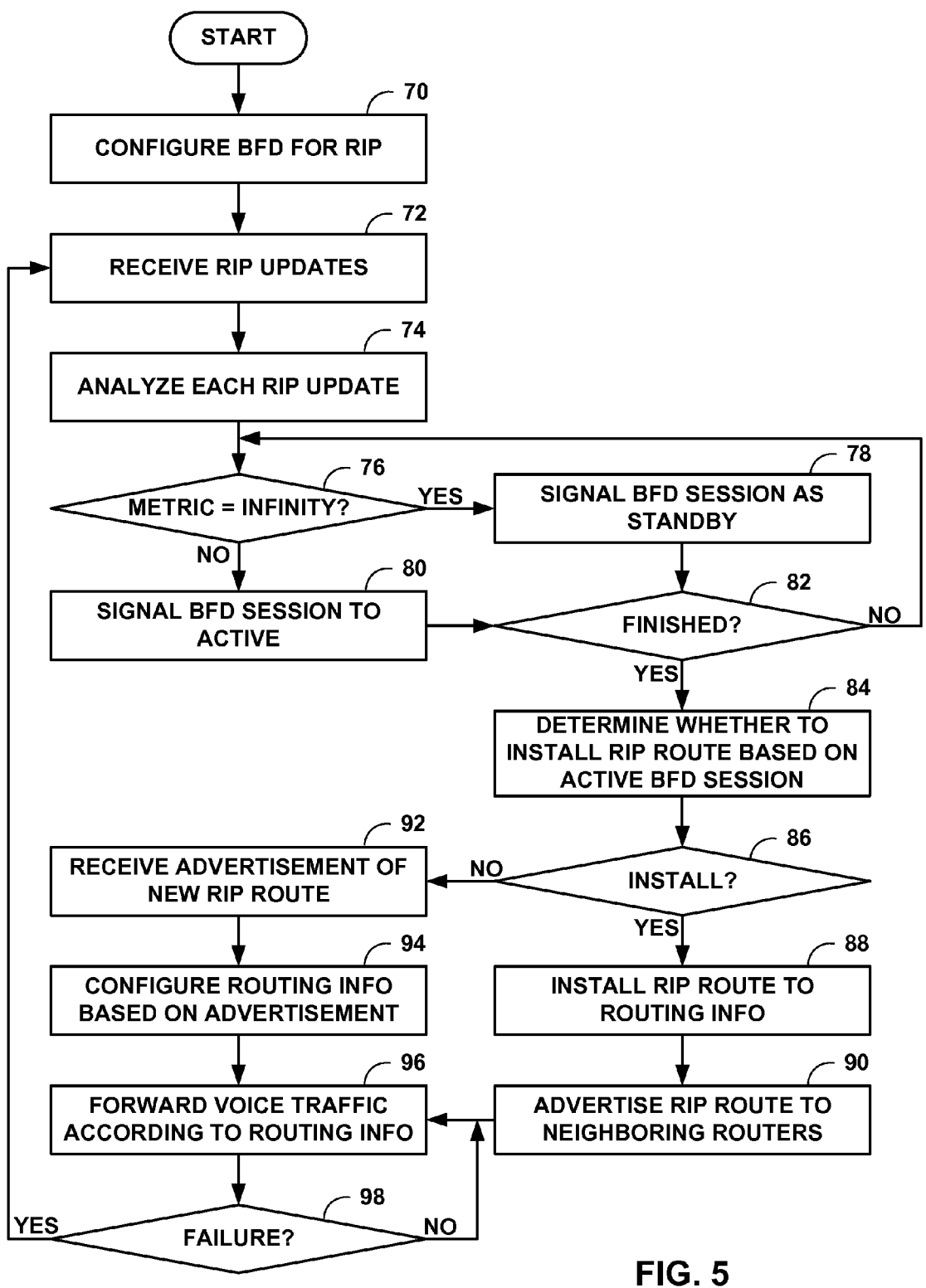
FIG. 5 is a flowchart illustrating exemplary operation of a router in performing non-revertive failover in accordance with the principles of the invention.

FIG. 5 is a flow chart illustrating exemplary operation of a router, such as router 26 of FIG. 3, in performing non-revertive failover in accordance with the principles of the invention. While described in reference to FIG. 2, the principles of the invention may apply to any network device capable of establishing RIP routes and signaling BFD sessions, and the invention should not be limited to the described embodiments.

Initially, a network administrator may configure router 26 such that it may implement BFD for RIP (70). Control unit 36 of router 26 receives a plurality of RIP updates (72), which may be substantially similar to RIP updates 46 of FIG. 3, generated and sent by a network device capable of acting as a gateway between a circuit-switched network, e.g., PSTN 18 of FIG. 1, and a packet-switched network, e.g., packet-switched network 14, such as media gateway 16.

Upon receiving the plurality of RIP updates, control unit 36 analyzes each one of the plurality of RIP updates 46 (74). In analyzing each of the plurality of RIP updates 46, control unit 36 parses each of the plurality of RIP updates 46 in accordance with RIP 40B in order to determine the metric value indicated by metric field 48I of each of the plurality of RIP updates 46. If one of the metric values equals infinity ("YES" branch of 76), control unit 36 signals that a BFD session across the associated one of links 22A, 22B is standby via BFD 40C, as described above (78). If one of the metric values equals a value less than infinity ("NO" branch of 76), control unit 36 signals that a BFD session across the associated one of links 22A, 22B is active via BFD 40C, as described above (80). Control unit 36 determines which of links 22A, 22B are associated with the plurality of RIP updates 46 by analyzing the source IP address of each of the plurality of RIP updates 46 (not shown in FIG. 3). Control unit 36 continues to signal corresponding BFD sessions until either an active or standby BFD signal exits for each of links 22A, 22B, or until control unit 36 is finished analyzing the plurality of RIP updates 46 (82).

Once finished ("YES" branch of 82), control unit 36 determines whether to install a RIP route to routing information 42 based on whether control unit 36 signaled an active BFD session (84). If control unit 36 signaled an active BFD session over link 20A, for example, control unit 36 installs a new RIP route to routing information 42 in accordance with RIP 40B, and advertises the new RIP route via one of BGP 38A or IGP 40A, as described above ("YES" 86, 88, 90). If control unit 36 only signaled standby routes, i.e., all of the metric values of each of the plurality of RIP updates 46 equal infinity, control unit 36 may wait to receive an advertisement from another network device indicating a new RIP route (92). Upon receiving the advertisement, control unit 36 may insert the advertised RIP route into its routing information 42, or more generally, configure routing information 42 based one advertisement (94). In either instance, router 26 either forwards voice traffic, for example, according to its routing information 42 (96).

Assuming for purposes of illustration that control unit 36 established the new RIP route, control unit 36 forwards voice traffic destined for subscribers 24A-24M that router 26 receives via the active BFD session to media gateway 16. Control unit 36 also forwards voice traffic destined for subscribers 24N-24Z and received from media gateway 16 to network device 12C via the new RIP route. Although control unit 36 does not monitor the active BFD session, media gateway may indicate failure of the active BFD session by transmitting a revised plurality of RIP updates, as described above. Thus, control unit 36 determines whether a failure occurred upon receiving a revised plurality of RIP updates ("YES" branch of 98, 92) and performs the operations described above to perform non-revertive failover (74-98). In some embodiments, while performing non-revertive failover, control unit 36 may remove the new RIP route from routing information 42, thus putting this failed RIP route on standby.

In some instances, during performance of non-revertive failover where router 26 reconfigures itself from an active router to a standby router, control unit 36 may update its routing information 42 such that it forwards voice traffic destined for the failed RIP route to the newly established active RIP route. These instances occur when the failover has not yet been fully propagated throughout network environment 10, for example. Router 26 may continue to forward this traffic to the now active router, such as network device 12B, until the failover has fully propagated throughout network environment 10.

In this manner, router 26 may maintain standby and active BFD sessions, where media gateway 16, or some other network device capable of acting as a gateway between a circuit-switched network and a packet-switched network, may monitor the active BFD session. Router 26 knows to signal these BFD sessions through the metric value stored in metric field 48I of a RIP update 46. The combination and interrelation between BFD and RIP therefore enables router 26 to install dedicated RIP routes in routing information 42, as well as act as a sub-second backup router capable of quickly configuring and installing a new RIP route over which it may route traffic that previously was routed along a failed RIP route. The failover is non-revertive in that router 26 continues to forward traffic along its newly installed RIP route until router 26 receives further RIP updates indicating otherwise. Various embodiments of the invention have been described. These and other embodiments are within the scope of the following claims.

The invention claimed is:

1. A method comprising:
   receiving, with a network device, a plurality of routing information protocol (RIP) updates each having a metric value;
   signaling a plurality of bidirectional forwarding detection (BFD) sessions based on the metric value of each RIP update, wherein signaling the plurality of BFD sessions includes signaling one of the plurality of BFD sessions is signaled as an active session;
   selectively installing, with the network device, a RIP route in routing information maintained by a control unit based on the metric value; and
   performing non-revertive failover with the network device in the event one of the plurality of BFD sessions fails, wherein performing non-revertive failover includes:
   receiving a second plurality of RIP updates each having a metric value;
   signaling the active one of the plurality of BFD sessions as standby based on the metric values of the second plurality of RIP updates; and
   uninstalling the RIP route from the routing information maintained by the control unit based on the metric values of the second plurality of RIP updates.

2. The method of claim 1, further comprising:
   forwarding traffic received from a first network device to a first subscriber via the RIP route; and
   forwarding traffic received from a second network device to a second subscriber via the BFD session,
   wherein the traffic received from the first and second network devices comprises voice traffic.

3. The method of claim 1,
   wherein receiving the plurality of RIP updates includes receiving a standby RIP update having a metric value that represents infinity, and
   wherein signaling a plurality of BFD sessions includes signaling one of the plurality of BFD sessions as a standby session upon receiving the standby RIP update.

4. The method of claim 1,
   wherein receiving the plurality of RIP updates includes receiving an active RIP update having a metric value less than infinity,
   wherein signaling the one of the plurality of BFD sessions as an active session includes signaling the one of the plurality of BFD sessions as an active session upon receiving the active RIP update, and
   wherein selectively installing the RIP route includes installing the RIP route in the routing information maintained by the control unit upon receiving the active RIP update.

5. The method of claim 4, wherein selectively installing the RIP route further includes advertising the RIP route to neighboring network devices via one or more of an interior gateway protocol (IGP) and a border gateway protocol (BGP).

6. The method of claim 5, further comprising:
   receiving an advertisement via one or more of the IGP and the BGP that indicates a next hop for traffic routed according to the previously uninstalled RIP route; and
   updating the routing information according to the advertisement with the control unit.

7. The method of claim 1, further comprising receiving a configuration that enables BFD sessions to be used for RIP.

8. The method of claim 1, wherein receiving the plurality of RIP updates includes receiving a plurality of RIP updates from a network device that acts as a gateway between a public system telephone network (PSTN) and a packet-switched network.

9. A network device comprising:
   a plurality of interface cards that receive a plurality of routing information protocol (RIP) updates each having a metric value; and
   a control unit that signals a plurality of bidirectional forwarding detection (BFD) sessions based on the metric value of each RIP update, wherein the control unit signals one of the plurality of BFD sessions as an active session, selectively installs a RIP route in routing information maintained by the control unit based on the metric value, and performs non-revertive failover in the event one of the plurality of BFD sessions fails by receiving a second plurality of RIP updates each having a metric value, signaling the active one of the plurality of BFD sessions as standby based on the metric values of the second plurality of RIP updates; and uninstalling the RIP route from the routing information based on the metric values of the second plurality of RIP updates.

10. The network device of claim 9, wherein the control unit further:
    forwards traffic received from a first network device to a first subscriber via the RIP route; and
    forwards traffic received from a second network device to a second subscriber via the BFD session,
    wherein the traffic received from the first and second network devices comprises voice traffic.

11. The network device of claim 9,
    wherein the plurality of interface cards receives the plurality of RIP updates by receiving a standby RIP update having a metric value that represents infinity, and
    wherein the control unit signals a plurality of BFD sessions by signaling one of the plurality of BFD sessions as a standby session upon receiving the standby RIP update.

12. The network device of claim 9,
    wherein the plurality of interface cards receive the plurality of RIP updates by receiving an active RIP update having a metric value less than infinity,
    wherein the control unit signals the one of the plurality of BFD sessions as an active session upon receiving the active RIP update, and
    wherein the control unit selectively installs the RIP route by installing the RIP route in the routing information maintained by the control unit upon receiving the active RIP update.

13. The network device of claim 12, wherein the control unit selectively installs the RIP route by further advertising the RIP route to neighboring network devices via one or more of an interior gateway protocol (IGP) and a border gateway protocol (BGP).

14. The network device of claim 13,
    wherein the interface cards further receive an advertisement via one or more of the IGP and the BGP that indicates a next hop for traffic routed according to the previously uninstalled RIP route, and wherein the control unit further updates the routing information according to the advertisement.

15. The network device of claim 9, wherein the control unit further receives a configuration that enables BFD sessions to be used for RIP.

16. The network device of claim 9, wherein the interface cards receive the plurality of RIP updates by receiving a plurality of RIP updates from a network device that acts as a gateway between a public system telephone network (PSTN) and a packet-switched network.

17. A method comprising:
sending a plurality of routing information protocol (RIP) updates that each have a metric value with a gateway network device that acts as a gateway between a circuit-switched network and a packet-switched network to a network device that routes traffic through the packet-switched network;
signaling a plurality of bidirectional forwarding detection (BFD) sessions to the gateway network device with the network devices based on the metric value of each RIP update, wherein signaling the plurality of BFD sessions includes signaling one of the plurality of BFD sessions is signaled as an active session;
selectively installing a RIP route in routing information maintained within the network devices based on the metric value of each RIP update; and
performing non-revertive failover in the event one of the plurality of BFD sessions fails with the network device, wherein performing non-revertive failover includes:
receiving a second plurality of RIP updates each having a metric value;
signaling the active one of the plurality of BFD sessions as standby based on the metric values of the second plurality of RIP updates; and
uninstalling the RIP route from the routing information maintained by the control unit based on the metric values of the second plurality of RIP updates.

18. A network system comprising:
a gateway network device that acts as a gateway between a circuit-switched network and a packet-switched network and includes at least two interfaces that send a plurality of routing information protocol (RIP) updates that each have a metric value; and
a network device that routes traffic through the packet-switched network and includes:
routing information that describes the topology of the packet-switched network; and
a control unit that signals a plurality of bidirectional forwarding detection (BFD) sessions based on the metric values of each RIP update, wherein the control unit signals one of the plurality of BFD sessions as an active session, selectively installs a RIP route in the routing information based on the metric values of each RIP update, and performs non-revertive failover in the event one of the plurality of BFD sessions fails by receiving a second plurality of RIP updates each having a metric value, signaling the active one of the plurality of BFD sessions as standby based on the metric values of the second plurality of RIP updates; and uninstalling the RIP route from the routing information based on the metric values of the second plurality of RIP updates.

19. The network system of claim 18, wherein the control unit further forwards traffic received from the gateway network device through the packet-switched network to a first subscriber via the RIP route, and forwards traffic received from the network device that routes traffic to a second subscriber via one of the plurality of BFD sessions.

20. The network system of claim 18,
wherein the at least two interface send the plurality of RIP updates by sending a standby RIP update having a metric value that represents infinity, and
wherein the control unit signals a plurality of BFD sessions by signaling one of the plurality of BFD sessions as a standby session upon receiving the standby RIP update.

21. The network system of claim 18,
wherein the at least two interfaces send the plurality of RIP updates by sending an active RIP update having a metric value less than infinity,
wherein the control unit signals the one of the plurality of BFD sessions as an active session upon receiving the active RIP update, and
wherein the control unit selectively installs the RIP route by installing the RIP route in the routing information upon receiving the active RIP update.

22. The network system of claim 21, wherein the control unit selectively installs the RIP route by further advertising the RIP route to a standby network device residing within the packet-switched network via one or more of an interior gateway protocol (IGP) and a border gateway protocol (BGP).

23. The network system of claim 22, wherein the control unit further performs the non-revertive failover by receiving an advertisement from the standby network device via one or more of IGP and BGP that indicates a next hop for traffic routed according to the previously uninstalled RIP route and updates the routing information according to the advertisement.

24. The network system of claim 21, wherein the gateway network device further monitors the active BFD session to determine whether the active BFD session has failed and sends the second plurality of RIP updates each having a revised metric value based on the determination.

25. The network system of claim 18, wherein the control unit further receives a configuration that enables BFD sessions for RIP.

* * * * *

UNITED STATES PATENT AND TRADEMARK OFFICE
CERTIFICATE OF CORRECTION

| | | |
|---|---|---|
| PATENT NO. | : 7,940,646 B1 | Page 1 of 1 |
| APPLICATION NO. | : 12/788115 | |
| DATED | : May 10, 2011 | |
| INVENTOR(S) | : Aggarwal et al. | |

It is certified that error appears in the above-identified patent and that said Letters Patent is hereby corrected as shown below:

Column 11, line 22 (Claim 1), "sessions is" should read -- sessions --

Column 11, line 23 (Claim 1), "signaled as an" should read -- as an --

Signed and Sealed this
Twelfth Day of July, 2011

David J. Kappos
*Director of the United States Patent and Trademark Office*